3,203,822
PRODUCTION OF POLYAMIDE COATINGS
Heinrich Junker and Werner Lauer, Frankfurt am Main,
Ernst Gauf, Eschborn, Taunus, Richard Weber, Oberursel, Taunus, and Wilhelm Würth, Frankfurt-Sossenheim, Germany, assignors to Metallgesellschaft Aktiengesellschaft, Frankfurt am Main, Germany
No Drawing. Filed May 31, 1962, Ser. No. 198,699
Claims priority, application Germany, Nov. 14, 1961,
M 50,868
11 Claims. (Cl. 117—21)

This invention relates to a process of applying adherent coatings of polyamide resins which are resistant to boiling water, wash or detergent solutions.

It is known to use a polyamide as a coating material for objects of daily use, as, for example, inlet insert members and wash solution containers of dish washing machines, or wash drums and wash solution containers of automatic washers. However, the use of polyamides as coating materials for such objects, especially on parts having a large surface, has been limited by the fact that the polyamide coating does not adhere well to the coated object when exposed to boiling water and especially boiling wash solutions. Thus these plastics heretofore could not be used in washing machines to coat parts which come in contact with the washing solution.

An object of this invention is to provide a process for applying coatings of polyamides which results in adherent coatings that are stable against boiling water and wash solutions.

According to the invention, the object to be covered is first coated with an intermediate layer of butadiene-styrene copolymer and such intermediate layer coated with the polyamide coating. The resulting polyamide top layer displays essentially improved adhesion to the coated object when it is, for example, subjected to the action of boiling water and wash solutions.

A known butadiene-styrene copolymer which has proven particularly suited for producing the intermediate layer is one that contains the butadiene and styrene in the ratio of 80 to 20. This copolymer is diluted, for example, in the ratio of about 1 to 1 with a solvent, known per se, or also a cross-linking agent, such as tetrachlorophthalic acid anhydride. It is then applied to the object to be coated, which has preferably been preheated, by means of a spray gun or by dipping, brushing or also electrostatically. Examples of known solvents which may be employed in this connection are mineral spirits, trichloroethylene and carbon tetrachloride and also mixtures of aliphatics, such as hexane, amylalcohol, methyl chloride and aromatics, such as benzene, nitrobenzene and halobenzenes, such as chloro and bromo-benzene. Ketones, such as methyl, ethyl and cyclohexane ketone, as well as esters, such as ethyl acetate, butyl acetate and methylglycol acetate may also be employed as solvents.

In addition to the above butadiene-styrene copolymer so-called modified products also may be employed within the scope of the invention. That is, this copolymer may, for example, be oxidized, such as by treating the mixture with oxygen until the desired degree of oxidation is obtained, or by treating it with organic peroxides at elevated temperatures; or, it may be acid modified, for example, by treating with 25% monoethyl phosphoric acid or with a halogenated phthalic acid anhydride in amounts of about 1 to 8%. Moreover, the resin may be modified by additives as, for example, thickening agents, coloring materials or metal powder.

The thickness of the intermediate layer amounts in general to about 0.01 to 0.12 mm. when it is supplied by spraying and about 0.04 mm. when applied by dipping or brushing.

The known preliminary treatment by roughening, sand blasting or etching of the surface to which the intermediate layer of the invention is to be applied may be omitted if the coated objects are not exposed to the elevated temperatures of boiling water or wash solutions. However, in general it is better to treat the surface to be covered by degreasing, etching with hydrochloric acid or phosphatizing, washing and drying before the intermediate layer is applied according to the invention.

Polyamides which are applied to the intermediate layer may be, for example, polyundecanamide, polycaprolactam and polyhexamethyleneadipanamide, known respectively as Rilsan, Perlon and nylon. Mixtures of these polymers may also be employed and it will be appreciated that the nature of the coating agent will be influenced by the ratio of the various constituents. Cross-linking agents, such as paraformaldehyde or polyoxymethylene, may be added to the polyamides which effect a cross-linking of the polyamides during the hot application of the coating.

The polyamide top layer is applied before the intermediate layer is fully hardened and consequently still in a reactive state. However, it is advantageous to set or harden the intermediate layer to a certain degree before applying the top layer in order to effect a good bonding between the intermediate layer and the base material. This may be done by known methods at room temperature or by supplying heat, thus expelling or evaporating the solvent employed in certain cases. Ovens, heating cabinets, hot air apparatus, infrared ray apparatus, or direct heating means may be employed to facilitate this hardening or setting. When a mixture of mineral spirits and isopropyl alcohol is employed as the solvent the drying is carried out, for example, at 120 to 150° C. during about 10 to 25 minutes. Temperature and time are regulated naturally in each case according to the solvent employed as well as the dimensions of the object to be coated.

The polyamide coating is applied to the intermediate layer in known ways. However, a process for applying a coating that adheres especially well comprises heating the object to be coated at a temperature of between about 300 and 350° C. for a short time and then immersing it in a fluidized bed of polyamide powder. The particle size of polyamide in the fluidized bed should be between 20 and 500$\mu$, preferably between 60 and 250$\mu$. The polyamide layer may also be applied with a flame spray gun wherein the temperature to which the polyamide powder is necessarily heated at the same time serves to dry the intermediate layer. The resulting polyamide layer is generally 0.2 to 0.4 mm. thick.

In order to give the polyamide layer the desired color, the polyamide powder and a coloring pigment are premixed in a special apparatus to attain a uniformly colored material, which is then applied as described either by means of the fluidized bed or spraying with a spray gun. In a similar manner filler material can be added to the polyamide or the coating can be given certain qualities by adding, for example, plasticizers, cross-linking agents, stabilizers and so forth.

After application of the polyamide coating the object provided with the coating can be heat treated at a temperature between 150 and 200° C. over a period of between 15 and 30 minutes, thus providing still a further improvement of the coating's adhesion to the base.

While the process of this invention is especially suited for applying adherent polyamide coatings to metal surfaces it is also applicable to surfaces other than metal such as stone, wood, plastic and the like. In general, the process may be employed with any solid object which is not distorted or decomposed at the temperatures to which the object may be heated in applying the coating or in heat treating the coating after application.

Objects to which a polyamide layer has been applied according to the process of the invention have been proven especially well suited for use as apparatus which is exposed to boiling water and wash solutions. This was heretofore not possible.

The process according to the invention is illustrated in the following examples.

*Example 1*

The surface of a sheet of steel was cleaned by sand blasting and a coating about 0.04 mm. thick of butadiene-styrene copolymerizate was applied with a spray gun employing a solution containing one part butadiene-styrene in the ratio of 80 to 20 to one part solvent consisting of three quarters mineral spirits to one quarter isopropyl alcohol. The coating was then predried by placing the sheet in a stream of hot air for about 10 minutes at temperatures of 100 to 120° C. The sheet was then heated 4 minutes at 300° C. and immersed in a fluidized bed of polyundecanamide powder about 5 seconds, thus depositing a coating of the polyamide. The total thickness of the coating including the intermediate layer was 0.3 mm. After cooling the sheet was subjected to a heat treatment at 150° C for 3 minutes.

The sheet coated according to the invention was boiled in a wash solution which contained a commercial washing agent in customary concentrations. After 1000 hours the sheet still showed no loosening of the coating. On the other hand when a sheet provided with a coating of the same polyamide but without an intermediate layer was boiled in the same wash solution the coating loosened after only 7 hours.

*Example 2*

A sheet of soft steel which had been cleaned by sand blasting was immersed in a solution consisting of 60 parts of butadiene-styrene copolymerizate in the ratio of 80 to 20 and 40 parts of monomeric styrene and then predried at a temperature of 120° C. for 10 minutes. The thickness of the resulting layer amounted to about 0.03 to 0.04 mm. After predrying, the coated sheet was heated in a hot air furnace for 3 minutes at 300° C. and immersed for 4 seconds in a fluidized bed of polyundecanamide powder that had been mixed with about 3% of a commercial cobalt blue. The total thickness of the resulting layer was 0.3 mm.

The sheet was tested in a boiling commercial wash solution in the usual concentrations and showed no loosening of the polyamide layer over a period of 750 hours.

*Example 3*

Non-sand blasted and sand blasted sheets of soft steel were sprayed with a solution consisting of 50 parts of butadiene-styrene copolymer in the ratio of 80 to 20 and 50 parts of a mixture of aromatic and aliphatic hydrocarbons using a commercial paint spray gun. At the same time the sheets were heated by the hot gases from a compressed propane ring burner connected in front of the gun. Immediately after application of the intermediate coating the sheets were immersed in a fluidized bed of polyundecanamide powder for 1 second. The total thickness of the finished coatings amounts to 0.35 mm.

The stability against the effects of boiling wash solutions exhibited by the coatings over a period of 750 hours was superior to that of samples similarly prepared without application of an intermediate layer according to the invention.

*Example 4*

A similarly sand blasted soft steel sheet was coated twice with a brush employing a solution consisting of 50 parts of butadiene-styrene copolymer in the ratio of about 80 to 20 and 50 parts of the usual solvent with the addition of 1% natural rubber (smoked sheets). After predrying for 8 minutes at a temperature of 130° C. the sample was heated for 4 minutes at 320° C. and coated by immersion for 3 seconds in a fluidized bed of polyundecanamide. The total coating obtained was 0.3 mm. thick.

The stability of the coatings was excellent and the superiority of this process was evidenced by the boiling test given in above examples.

According to another embodiment of the process, the butadiene-styrene copolymer employed as the intermediate layer is diluted with halogenated, saturated or unsaturated hydrocarbons or with hydrocarbons having mixed halosubstitution, especially with trichloroethylene, carbon tetrachloride or methylene chloride until the ultimate solution possesses the corresponding viscosity desired for the coating process selected.

It was found that halogenated saturated or unsaturated hydrocarbons such as trichloroethylene, carbon tetrachloride and methylene chloride exhibit an especially good solvent action and have the further advantage that they are difficultly inflammable or non-flammable.

Depending on the method selected for applying the intermediate layer according to the invention, the solvent is employed in larger amounts with, for example, an immersion method, than when the coating is applied with a spray gun. As far as adding a commercial butadiene-styrene copolymer which is already admixed with the usual mineral spirits and isopropyl alcohol as the starting material, a mixture of this starting material with, for example, trichloroethylene is satisfactory for use in an immersion process in the ratio of 1.5 to 1. But, when the known butadiene-styrene copolymer is employed as the starting material alone as the resin, a mixture in the ratio of 1 to 1.5 is necessary. In general it is desirable in using an immersion process to adjust the starting viscosity of this known copolymer by adding known diluents or solvents from a rating of 60 seconds to one of 15 seconds, employing the German Industrienorm 53211 to rate the viscosity. This means of rating employs a discharge cup and a discharge nozzle diameter of 4 mm. A higher viscosity rating must be produced if the mixture is to be sprayed.

The following three examples illustrate this feature of the invention.

*Example 5*

A copolymer of 80 parts butadiene and 20 parts styrene (100% non-volatile constituents) was dissolved in trichloroethylene in the ratio of 1 to 1.5 or in such amounts that the viscosity, determined according to the discharge cup method mentioned in Example 4, was about 15 to 16 seconds time. This solution was applied as the intermediate layer to the cleaned surface of the object to be coated at room temperature employing an immersion process.

*Example 6*

50% of the base copolymer of Example 5 consisting of non-volatile constituents was mixed with the same amount of solvent consisting of 37.5% mineral spirits and 12.5% isopropyl alcohol.

To avoid inflammability methylene chloride was added to the dissolved resin in the ratio of 1.5 to 1, producing a viscosity of 16 seconds discharge time, determined according to the German Industrienorm given. This solution was then employed to provide objects to be coated with an intermediate coating as in Example 5.

*Example 7*

When spraying of the intermediate layer is more suitable on account of the size and shape of the workpieces, the viscosity of the starting mixture is adjusted accordingly to correspond to a discharge time of about 25 seconds. Using the copolymer consisting of non-volatile constituents, as given in Example 5, a mixture was applied containing 1 part copolymerizate to 1.2 parts of carbon tetrachloride. This solution was sprayed onto a sheet with a paint spray gun. Additionally, the sheet was placed in a furnace at 360° C. and coated with a layer of polyundecanamide according to the process outlined in Example 1.

*Example 8*

Polycaprolactam was applied as the polyamide coating using the intermediate layer and conditions given in Examples 1–7 with the exception that the sheet coated was preheated at 340° C. for 3 to 6 minutes before application of the polycaprolactam. Coatings of superior adhesion resulted.

*Example 9*

Polyhexamethyleneadipanamide was also applied as the polyamide coating with the intermediate layer and conditions given in Examples 1–7, except that the object coated was preheated at 350° C. for 3 to 4 minutes before application of the polyamide. Again coatings of excellent adhesion resulted.

We claim:

1. A process for producing an adherent polyamide coating on a substrate which comprises in combination respectively applying a solution of butadiene-styrene copolymer in the ratio of about 80 to 20 and an organic solvent to form a thin intermediate coating on the substrate; predrying the resulting intermediate coating; heating the substrate and resulting butadiene-styrene copolymer coating at about 300°–350° C. for a few minutes and immersing the substrate with butadiene-styrene copolymer coating into a fluidized bed of polyamide powder for a few seconds; and cooling the resulting coatings, thereby producing a polyamide coating on the substrate which is resistant to loosening after extended periods of exposure to boiling wash solutions.

2. The process as in claim 1 wherein the said solution of a butadiene-styrene copolymer contains a halogenated hydrocarbon as a solvent.

3. A process as in claim 1 wherein the polyamide is admixed before application with a composition selected from the group consisting of dyes, pigments and fillers.

4. A process as in claim 1 wherein the polyamide is polyundecanamide.

5. A process as in claim 1 wherein the polyamide is polycaprolactam.

6. A process as in claim 1 wherein the polyamide is polyhexamethyleneadipanamide.

7. A process as in claim 1 wherein the particle size of the polyamide powder is about 20–500 microns.

8. A process as in claim 1 wherein the substrate and resulting butadiene-styrene intermediate and polyamide coatings are heat treated at about 150° to 200° C. for a few minutes.

9. A process as in claim 1 wherein the intermediate coating is applied by spraying a solution of the butadiene-styrene copolymer and organic solvent onto the substrate.

10. A process as in claim 1 wherein the intermediate coating is applied by immersing the substrate in a solution of butadiene-styrene copolymer and organic solvent.

11. A process for producing an adherent polyamide coating on steel which comprises in combination respectively applying a solution of about one part butadiene-styrene copolymer in the ratio of about 80 to 20 and about one part of organic solvent to form a thin intermediate coating on said steel; predrying the resulting intermediate coating; heating the steel and resulting butadiene-styrene copolymer coating at about 300°–350° C. for a few minutes and immediately thereafter immersing the steel with butadiene-styrene copolymer coating into a fluidized bed of polyamide powder for a few seconds; cooling the resulting coatings; then heat treating the steel and resulting coatings at about 150° to 200° C. for a few minutes thereby producing a polyamide coating on steel which is resistant to loosening after extended periods of exposure to boiling wash solutions.

References Cited by the Examiner

UNITED STATES PATENTS

| | | | |
|---|---|---|---|
| 2,252,554 | 8/41 | Carothers | 117—72 |
| 2,349,951 | 5/44 | Fuller et al. | 117—75 X |
| 2,930,838 | 3/60 | Chizallet et al. | 117—218 X |
| 3,008,848 | 11/61 | Annonio. | |
| 3,019,126 | 1/62 | Bartholomew | 117—21 |

RICHARD D. NEVIUS, *Primary Examiner.*